F. G. SALERNO.
MACHINE FOR COATING CAKES.
APPLICATION FILED JUNE 15, 1917.

1,413,995.

Patented Apr. 25, 1922.
7 SHEETS—SHEET 2.

Witness:
L. B. Graham

Inventor:
Ferdinando G. Salerno
By Rector, Hibben, Davis & Macauley
his Att'ys

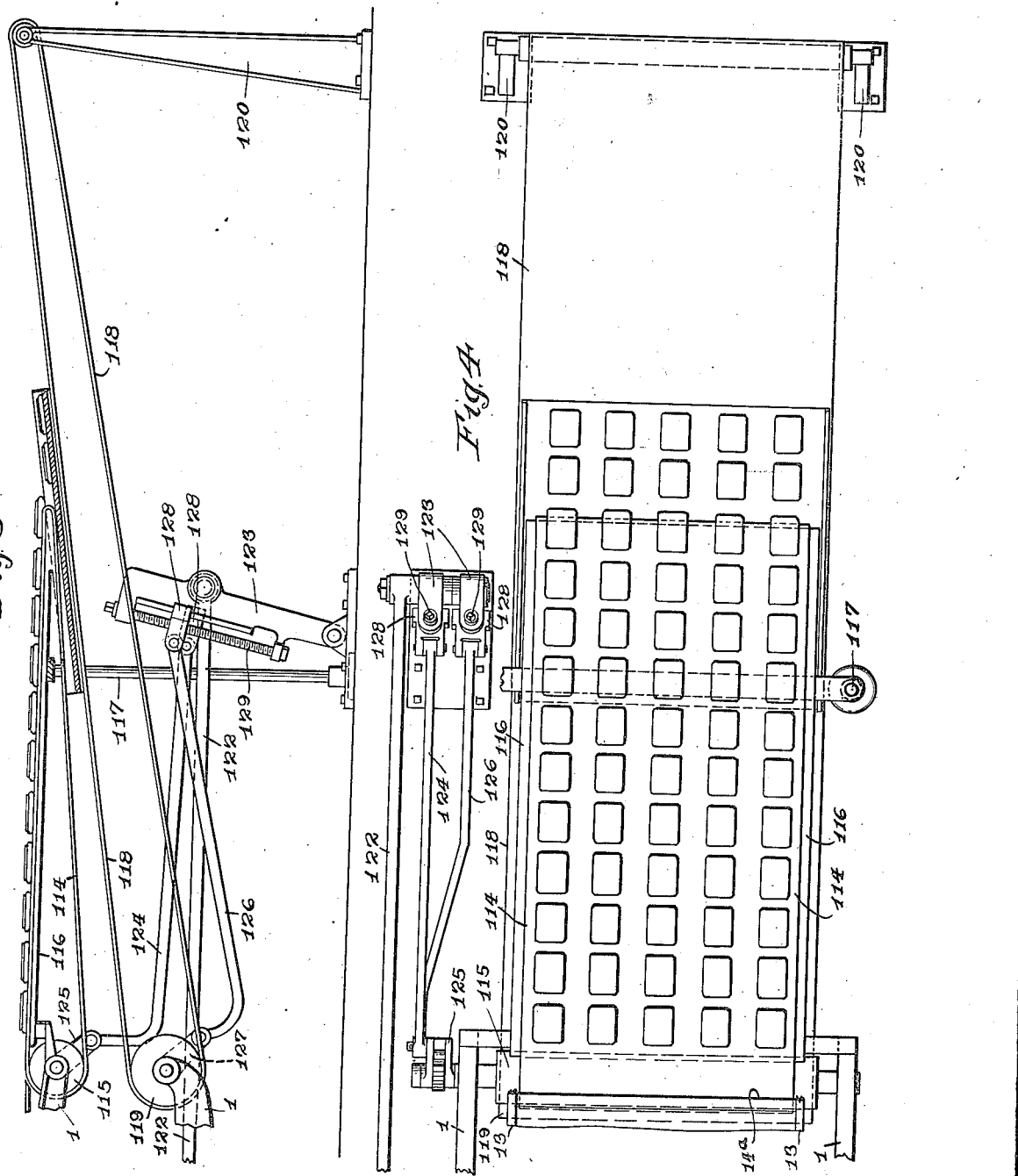

F. G. SALERNO.
MACHINE FOR COATING CAKES.
APPLICATION FILED JUNE 15, 1917.
1,413,995.
Patented Apr. 25, 1922.
7 SHEETS—SHEET 4.
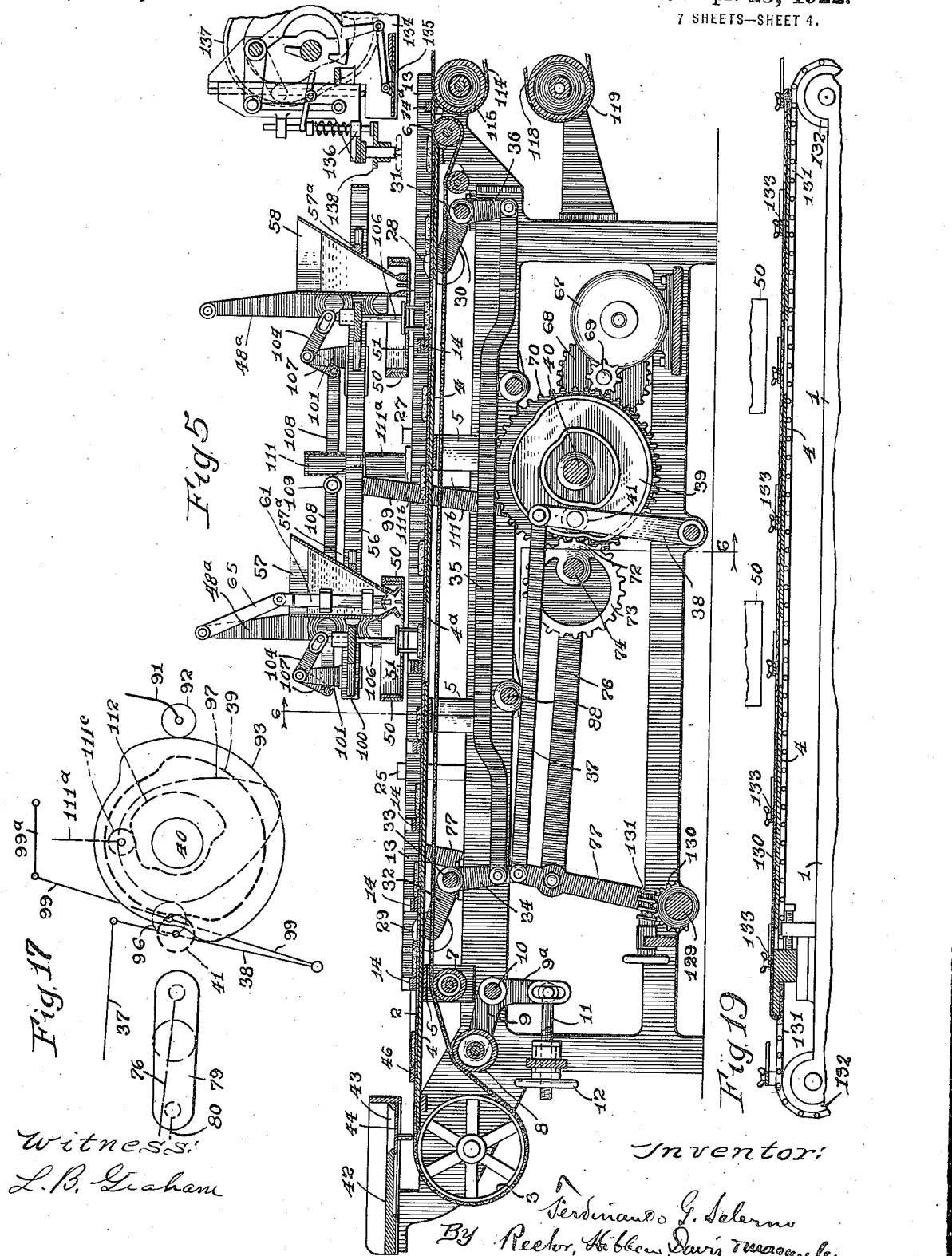

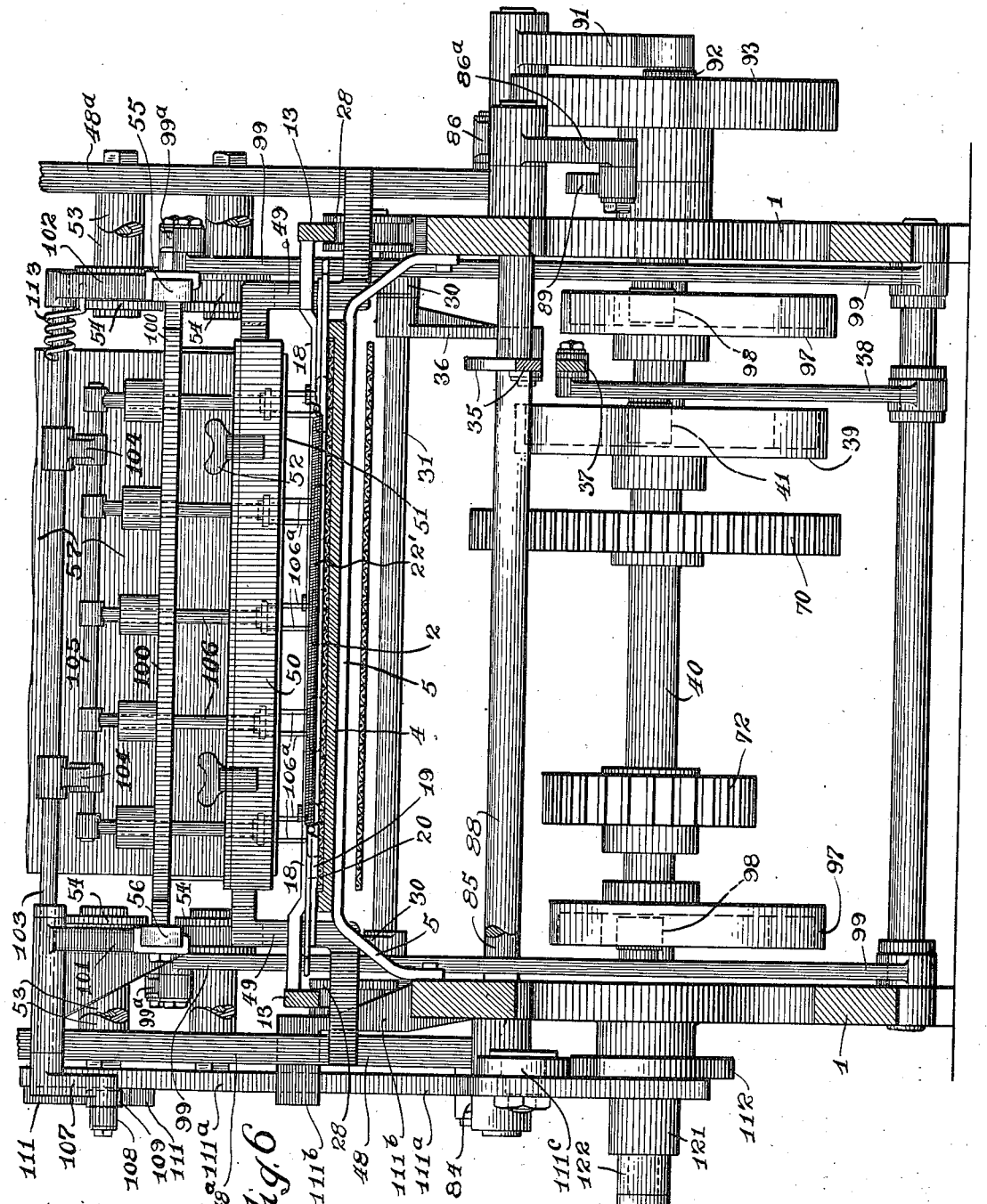

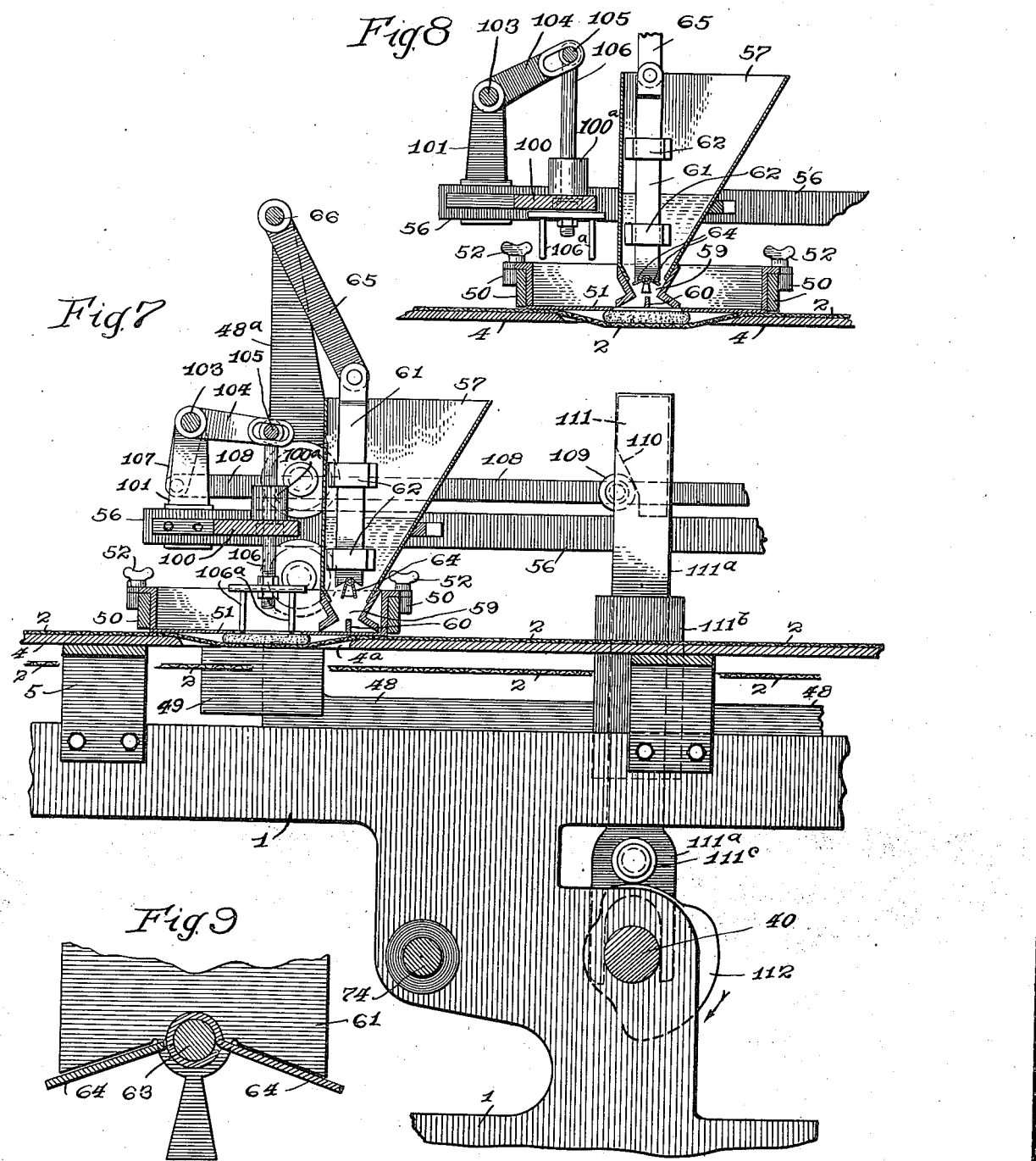

F. G. SALERNO.
MACHINE FOR COATING CAKES.
APPLICATION FILED JUNE 15, 1917.
1,413,995.
Patented Apr. 25, 1922.
7 SHEETS—SHEET 7.
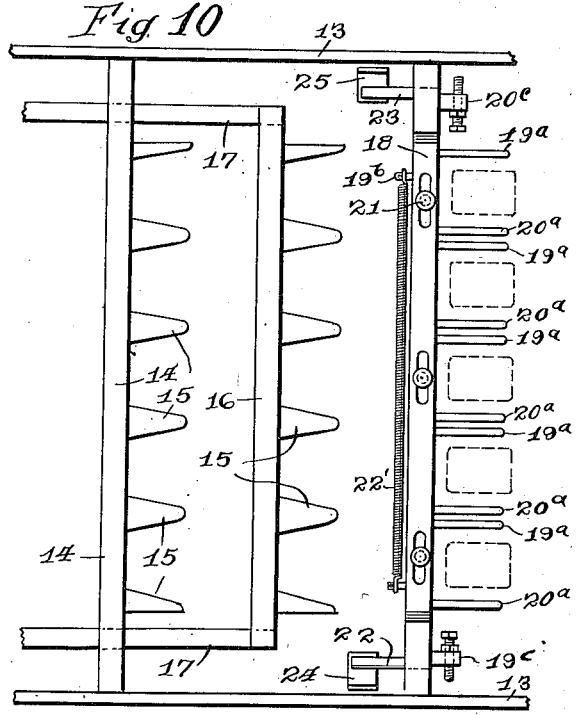
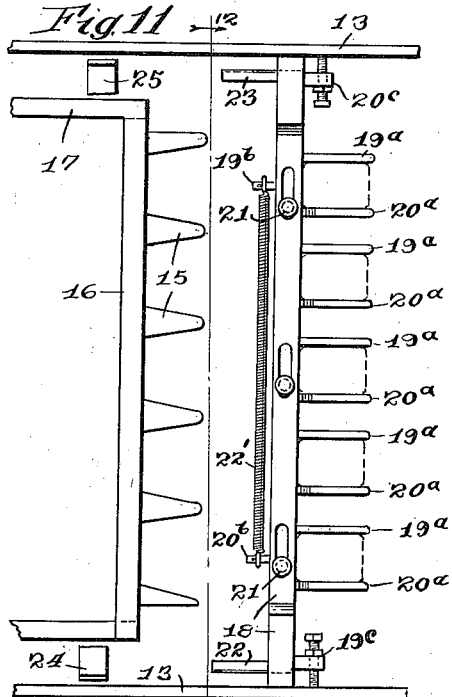
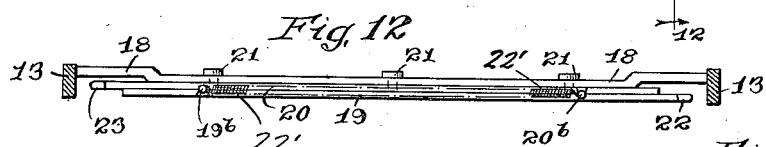
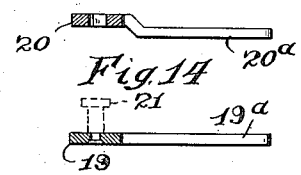
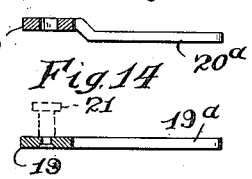
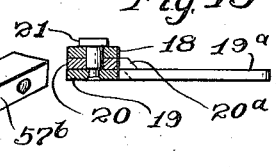
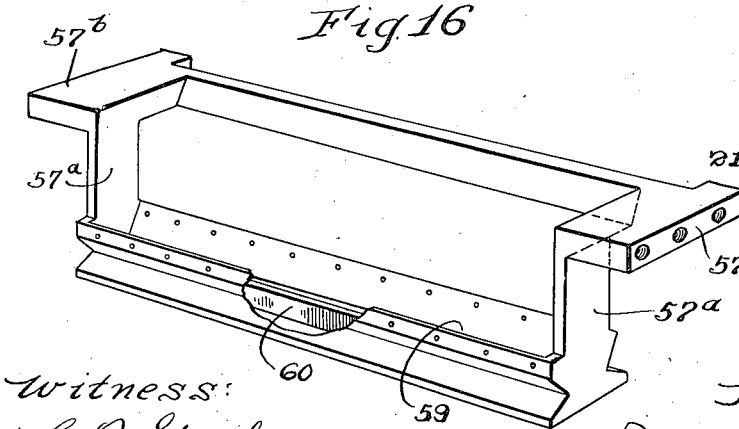

UNITED STATES PATENT OFFICE.

FERDINANDO G. SALERNO, OF CHICAGO, ILLINOIS.

MACHINE FOR COATING CAKES.

1,413,995.  Specification of Letters Patent.  Patented Apr. 25, 1922.

Application filed June 15, 1917. Serial No. 174,898.

*To all whom it may concern:*

Be it known that I, FERDINANDO G. SALERNO, a citizen of the United States, residing at Chicago, in the county of Cook and State of Illinois, have invented certain new and useful Improvements in Machines for Coating Cakes, of which the following is a specification.

My invention relates to a new machine which I have devised for the purpose of automatically effecting the coating of wafers, cookies, cakes and similar bakery goods with various sorts of confections by spreading and forcing the confection, whether sufficiently thin to flow, or relatively stiff and thick, through stencil plates which are imposed upon the cakes to govern the field of the coating and the thickness thereof. The object of my invention is generally to provide a machine to which cakes may be supplied by operatives at one end and which will operate to automatically coat the cakes and deliver them to trays supplied at the other end, thus enabling the work to be accomplished with great rapidity and a relatively small amount of hand work, with consequent economy and all the advantages of rapid production of the goods on a large scale. To this end I have devised the machine hereinafter described, containing various features of novelty, among which may be here mentioned the mechanism by which the coating of the cakes is effected, the essential elements of my invention being more particularly pointed out in the appended claims.

Figure 1:
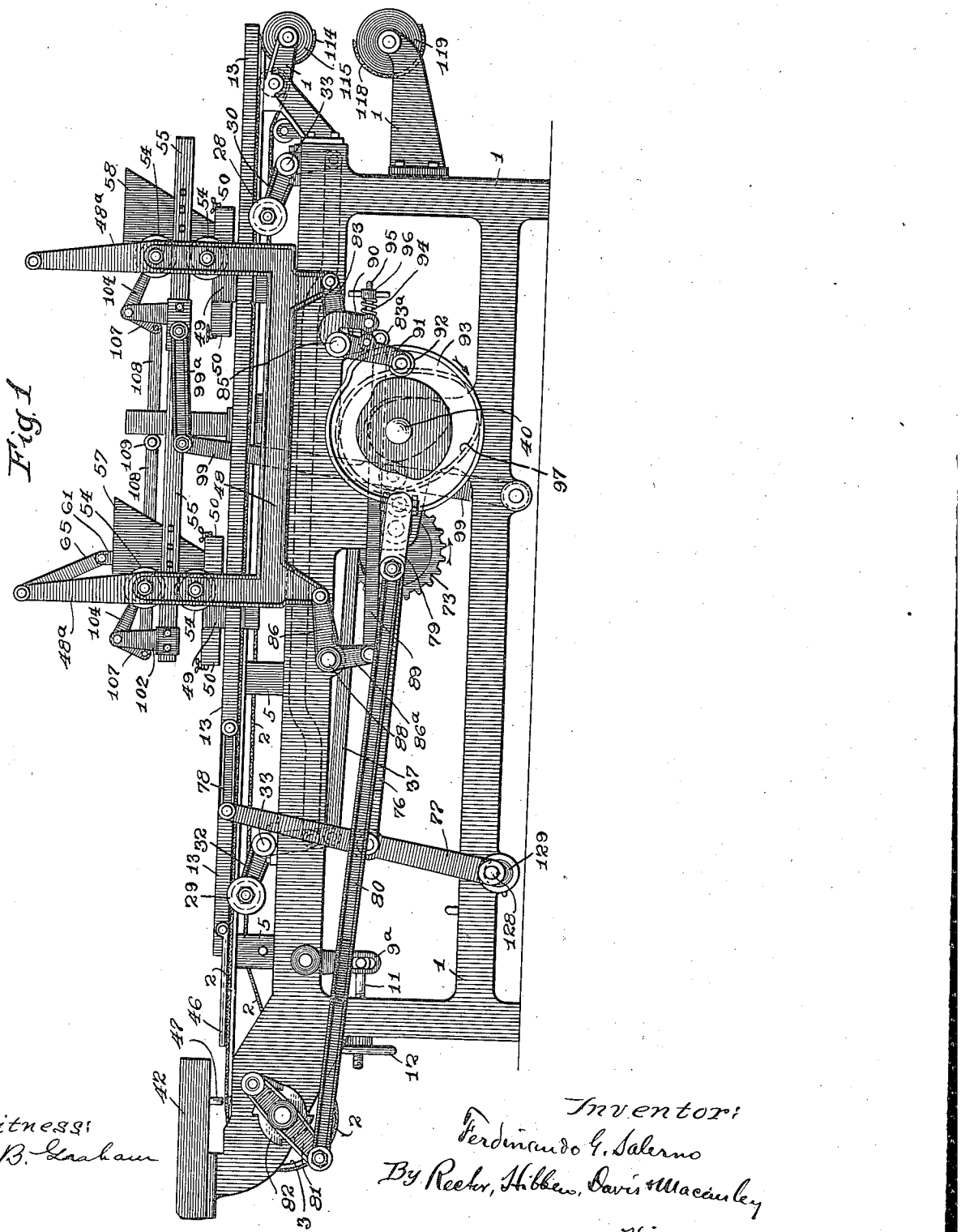
Figure 2:
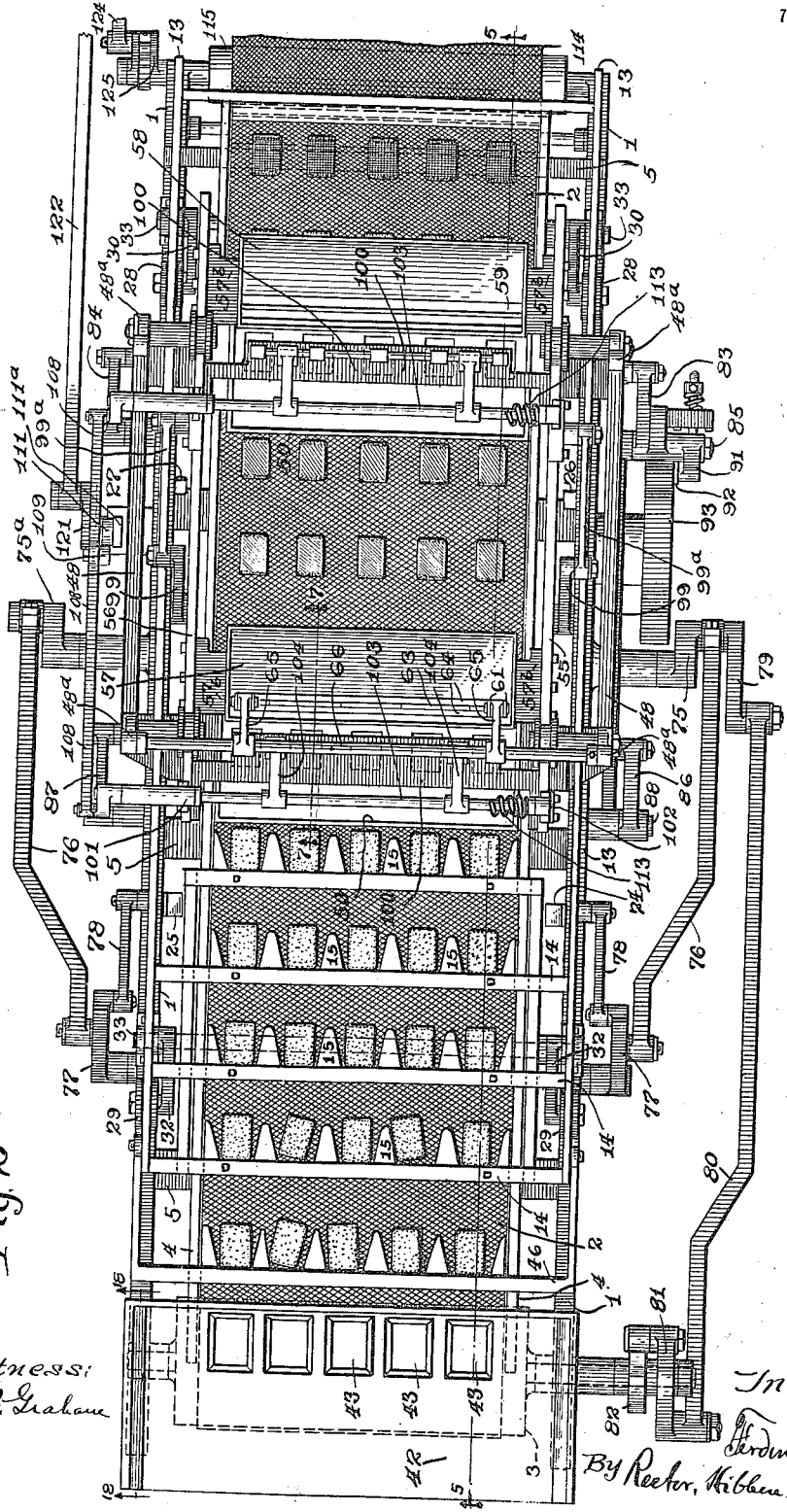
Figure 18:
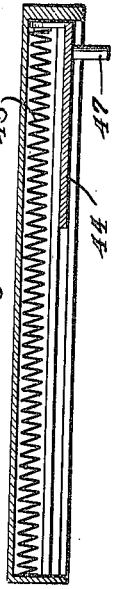

In the drawings, Fig. 1 is a side elevation of the machine proper, the delivery belts at the front end of the machine being omitted; Fig. 2 is a plan view of the same portion of the machine; Fig. 3 is a side elevation of the front end of the machine, forming a continuation or extension of Fig. 1; Fig. 4 is a plan view of the same portion of the machine; Fig. 5 is a longitudinal vertical section on the line 5—5 of Fig. 2, parts beyond the plane of the section being shown in elevation; Fig. 6 is a vertical cross section of the machine on the broken line 6—6 of Fig. 5; Fig. 7 is a vertical longitudinal section on the line 7—7 of Fig. 2, illustrating more particularly the hopper and stencil box and certain associated mechanisms; Fig. 8 is a similar section of the hopper and stencil box, but showing the parts in different positions; Fig. 9 is an enlarged fragmentary view of the lower end of the forcing valve; Fig. 10 is a plan view of the feeding frame showing the spacing fingers separated; Fig. 11 is a similar view but showing the frame in forward position with the fingers drawn towards the cakes to space them in alinement with the stencil openings; Fig. 12 is a section on the line 12—12 of Fig. 11, the closing spring being omitted to better show the relation of the finger bars; Figs. 13, 14 and 15 cross-sections, respectively of the top finger bar, bottom finger bar, and both bars connected to the supporting bar; Fig. 16 is a perspective view of the casting forming part of one of the hopper structures; Fig. 17 a diagrammatic view of the cams on the main drive shaft and the cranks of the spacing and belt-shifting mechanisms; Fig. 18 a section on the line 18—18 of Fig. 2, showing the spring for extending the shutter at the front of the feed table; and Fig. 19 a fragmental vertical longitudinal section, showing modified construction of certain parts of the machine.

The same reference characters indicate the same parts in all the figures of the drawings.

The general organization of the machine will first be briefly outlined, and a description of the separate portions thereof will then be given in such detail as is necessary to a full understanding of my invention.

At what will be termed the rear end of the machine is arranged a supply table adapted to contain a supply of cakes, which are arranged by attendants a row at a time upon a reciprocating shutter at the front of the table. The shutter is arranged to drop the rows of cakes successively upon the surface of a carrier belt, the top reach of which extends from around an actuating drum forwardly over a supporting table. By suitable operating connections this belt is given a step-by-step forward movement. A spacing and positioning frame to which is imparted a four-way movement is arranged above the carrier belt, this frame being provided with a series of notched bars and an automatic rectifying or positioning bar for each coating mechanism, of which one or more may be employed, two being used in the machine herein described. The spacing frame, by operating connections hereinafter described, is arranged to move horizontally forward adjacent the surface of the carrier belt, then move rearwardly and also rise to clear the rows of cakes to the rear of those acted upon, and then drop to its original position behind such rows, and so on, in synchronism with the carrier belt. The forward stroke of the spacing frame takes place during the forward movement of the carrier belt, but it is of slightly greater extent and terminates slightly after the end of the belt movement, with the result that the rows of cakes are slid forward a short distance on the belt at each stroke and the two rows acted on by the rectifying or positioning bars are accurately aligned under the orifices of the stencil plates of the vertically movable coating mechanisms. In the intervals of rest of the cake feeding mechanism—that is, while the belt is idle and spacing frame is moving rearward,—the coating mechanism descends into contact with the cakes, applies a coating, and then rises while the carrier belt and spacing frame make a forward stroke. Between the feed table and rear coating mechanism the cakes are acted upon by the series of notched bars and the rear automatic positioning bar acts to align the cakes under the stencil orifices of the rear coating mechanism. The movement of the belt carries the rows of cakes forwardly from the rear to the forward coating mechanism, a second rectifying and positioning bar carried by the spacing frame acting to position each row accurately under the stencil orifices of the forward coating mechanism, after which the cakes are carried forwardly to the end of the top reach of the carrier belt and there transferred across a narrow supporting table by a notched cross-bar at the front end of the carrier frame onto an intermediate delivery belt. This belt is given a step-by-step forward movement of less extent than the carrier belt, so that the rows of cakes will be more closely spaced thereon than on the carrier belt, and the intermediate belt delivers the cakes to trays arranged by attendants upon a second delivery belt.

Coming now to a more detailed description of the several parts of the machine, it will be understood that the main frame 1 which carries and supports the greater portion of the movable elements may be framed and constructed of any suitable members jointed and secured together to afford a proper support and bearing for the various parts and mechanisms.

The carrier belt 2 at the rear end of the machine travels around a feed drum 3 journaled in the main frame, the top reach passing over and lying upon a table 4 supported by cross-bars 5 forming part of the framework, and near the front end of the main frame said belt passes around an idler roller 6, the lower reach of the belt returning to the drum 3 over an idler roller 7 and an adjusting roller 8 journaled in a pair of rock arms 9 fixed to a rock shaft 10, one of the arms 9 being formed with a slotted extension 9ª constituting a bell-crank, and an adjusting bolt 11 having its head arranged to engage the slot in the bell-crank and its shank arranged to cooperate with a hand-wheel 12 being provided to enable the roller 8 to be given the exact adjustment required for the desired tension. The table 4, it may here be explained, is interrupted by spaces 4ª extending thereacross the full width of the belt, directly underneath the stencil plate of each of the coating mechanisms, later to be described.

The spacing frame by which the cakes are moved forwardly on the carrier belt includes side bars or rails 13, and rigidly secured thereto a series of cross-bars 14, which above the carrier belt are equipped with forwardly projecting spacing blocks 15 leaving spaces therebetween slightly larger than the cakes designed to be operated upon. A shorter cross-bar 16 supported by bars 17 arranged parallel with the side bars 13 and secured to the cross-bars 14 is arranged forwardly of the forward cross-bar 14 and equipped with similar spacing blocks 15. Forwardly of the bar 16 and secured to the side bars 13, is arranged a slotted cross-bar 18, to which are slidingly attached a lower finger bar 19 carrying a series of fingers 19ª and an upper finger bar 20 carrying a series of fingers 20ª. The bars 19 and 20 are slidingly secured to the bar 18 by means of shouldered and headed studs 21 secured to the lower bar 19 and passing through slots in the upper finger bar and the slots of the cross-bar 18. A coiled spring 22′ secured to a rearwardly projecting stud 19ᵇ on the bar 19 and a similar stud 20ᵇ on the bar 20 yieldingly tends to maintain the bars in the position shown in Fig. 11, adjustable stops 19ᶜ on the lower bar and 20ᶜ on the upper bar being provided to enable the spread of the fingers to be regulated. The lower bar 19 is also provided with a contact finger 22, and the upper bar 20 with a contact finger 23 respectively arranged to cooperate with wedge shaped cam blocks 24 and 25 secured to opposite sides of the main frame 1 of the machine, and temporarily spread the fingers 19ª and 20ª to the position shown in Fig. 10 as the spacing frame is lowered to the plane of the cakes.

The function of the finger bars is to accurately align the cakes under the stencil openings of the coating mechanism, and since in the machine now being described two coating mechanisms are employed a second set of finger bars is mounted in the spacing frame adjacent the second or forward coating mechanism, and arranged to be operated by cam blocks 26 and 27, similar to the cams 24 and 25, and likewise mounted at opposite sides of the main frame of the machine. At the front end of the spacing frame a cross-bar 14ª similar to the cross-bars 14 is provided to transfer the coated cakes across a narrow supporting plate to the second or intermediate belt hereinafter described.

The spacing frame which has just been described is carried by a front pair of double flanged rollers 28—28 and a rear pair of similar rollers 29, with which the side-bars 13 engage, the first mentioned pair being carried by a pair of rock arms 30—30 secured to the opposite ends of a rock shaft 31 journaled in the main frame 1, and the rear pair being carried by a pair of rock arms 32—32 secured to a similar rock shaft 33, see Figs. 1 and 5. The rear rock shaft 33 has secured to it an arm or lever 34, which is pivotally connected to a bar 35 also pivotally connected to an arm 36 on the front rock shaft 31, whereby the rock shafts 31 and 33 are caused to oscillate in unison to raise and lower the spacing frame. The lower end of the lever 34, which extends below its pivotal connection with the bar 35, is pivotally connected by a rod 37 with the top end of a vibrating lever 38, the lower end of which is pivoted on the main frame of the machine. A double-faced cam 39 secured to a driven cam shaft 40 and engaging a cam roller 41 carried by the lever 38 intermediate its ends serves to vibrate such lever and oscillate the rock shafts 31 and 33 as described.

At the rear end of the machine and overhanging the rear portion of the carrier belt, is arranged a feed table 42, the front of which is formed with openings 43 in which the attendants of the machine may arrange cakes from a supply on the table, see Figs. 1, 2 and 5. Underneath the openings is arranged a sliding shutter 44 which is forwardly spring-pressed to closed position by springs 45 arranged to bear against its ends at opposite sides of the machine, as illustrated in Figs. 2 and 8. The shutter is intermittently pressed rearwardly by a bail 46 pivoted to the rear of the spacing frame, and which, when the frame is reciprocated in the manner hereinafter described, slides backwardly and forwardly on the surface of the belt underneath the shutter and in its rearward movement contacts a pair of depending pins 47 on the shutter and forces it rearwardly against the tension of the springs 45 to drop a row of cakes on the table in front of the bail. On its forward movement the bail (which is similar in construction to the cross-bars 14 of the spacing frame), shifts the row of cakes forwardly into position to be acted upon by the rear cross-bar 14 of said frame.

The principal parts of the coating mechanism of the machine are carried by a vertically movable lifting frame which in the machine illustrated includes vertically arranged U-shaped frame members 48 at opposite sides of the machine, connected at front and rear by Z-shaped web or bracket members 49 with front and rear rectangular stencil frames 50, see Figs. 1, 2, 6 and 7. In each such frame is arranged a stencil plate 51 consisting of a sheet metal plate having openings cut into it of the proper size and shape for coating the cakes being operated upon, Figs. 5, 7 and 8. In order to provide for a variety of work, the stencil plates, formed with openings of different sizes and shapes, are made removable and interchangeable, and in the present instance each stencil plate forms the bottom of a shallow oblong box having flanged sides which by means of the thumb screws 52 may be clamped to the frame 50.

Each of the uprights 48ª of the U-shaped frames supports upon inwardly extending studs 53—53 a pair of grooved rollers 54—54 adapted to engage the top and bottom respectively of two horizontal bars 55 and 56 adjacent opposite sides of the machine, Figs. 1 and 6. The hoppers 57 and 58 are rigidly secured to these bars 55 and 56, and the latter are also connected by cross-bars 100—100, in which are formed guides for a stripper mechanism, hereinafter described, the whole forming what may be termed a hopper frame, horizontally reciprocable in the lifting frame. In the present instance two forms of hopper are shown, the bottom portion of the hopper 57 consisting of a casting 57ª, (shown in perspective in Fig. 16), the upper part of which casting consists of laterally extending plates or flanges 57ᵇ—57ᵇ which are bolted to the opposite bars 55 and 56, see Figs. 2, 5, 7 and 16. Near the bottom of the hopper the front and rear walls are inclined towards each other to form a throat 59, and below the throat the lower portions of such walls spread widely apart at an obtuse angle with respect to each other and at an acute angle with the stencil plate to form what for purposes of definition may be termed spreader walls. The lower edges of these spreader walls make sliding contact, see Figs. 7 and 8, with the stencil plate. Secured to and extending between opposite ends of the hopper and arranged centrally of the hopper throat, and also making sliding contact with the stencil plate, is preferably arranged a separating bar 60.

The form of hopper just described is intended to be used in connection with a plastic but relatively stiff confection, and in order to force such material through the throat of the hopper I have provided a forcing mechanism consisting of sliding bars 61 confined by guides 62 secured to the ends of the hopper, and connected by a pivot rod 63 adjacent their bottom ends, see Figs. 1, 5, 7 and 8. Hinged to this rod are two flaps 64—64, the opposite ends of which project respectively into the planes of the bars 61, the bars being cut away to receive them, as shown in Fig. 9, and permit them to swing from the position shown in such figure to the position shown in Fig. 7, or vice versa. The upper ends of the bars 61 are pivotally connected by links 65 with a cross-rod 66 extending between the tops of the uprights 48$^a$ in a vertical line with the center of the stencil openings, so that as the hopper structure is reciprocated in the lifting frame and the hoppers pass from the position shown in Fig. 7 to the central position shown in Fig. 8, the bars 61 and connected parts will be forced down and the flaps 64 opened or spread apart to force the confection down through the throat of the hopper, and as the hopper continues to the limit of its rearward movement to a position at the rear of the stencil plate, the bars will be lifted and the flaps drop towards each other, and as the hopper passes from rearward position to forward position on its return stroke, the downward and upward movement of the forcing mechanism will be repeated.

The other form of hopper, marked 58, intended for spreading confections of a thinner consistency which have a fluid flow, is not provided with any forcing mechanism, and the base of the hopper is not formed with the flaring spreader wall of the form of hopper first described. However, the hoppers are removable and interchangeable, and two hoppers of the same form may be used if desired.

A stripper mechanism, which acts to retain the cakes on the belt while the spacing frame is being withdrawn after the completion of a spacing stroke and while the coating mechanism is descending, and which also acts to strip the cakes from the stencil plate in case they should adhere to it as it ascends, is also supported on and carried by the bars 55 and 56 so as to move as a whole with the hoppers. Slightly to the rear of each hopper upright brackets 101, 102 are secured to the bars 55 and 56, and journaled in the tops of these brackets is a rock shaft 103 to which is secured a pair of rock arms 104, the outer ends of these arms being formed with elongated slots engaging a rod 105 to which are secured a series of stripper rods 106, guided in blocks 100$^a$ secured to the cross-bar 100 hereinbefore mentioned,—see Figs. 1, 2, 6, 7 and 8. The lower end of each rod 106 is equipped with a group of separated knockout pins 106$^a$. At the lefthand side of the machine (see Figs. 1, 2, 6 and 7), each of the two rock shafts 103 has secured to it a rock arm 107 connected by a bar 108 to cause them to oscillate in unison. Mounted upon this bar, intermediate its ends, is a cam roller 109 which is adapted to contact and cooperate in a manner hereinafter explained, with the inclined face 110 of a cam block 111 secured to a bar 111$^a$ slidingly mounted in a bracket 111$^b$ in the main frame 1 of the machine, and the position of which is governed by a rotating cam 112 mounted at the lefthand side of the machine on the outer end of the shaft 40, which cam is arranged to cooperate with a cam roller 111$^c$, mounted on the lower end of said bar. Springs 113 are provided to yieldingly urge the rock shafts 103 to rotate in a direction to press the roller 109 forwardly towards the cam block.

The operating connections by which the parts thus far described are actuated may next be conveniently described. Through a pinion on the shaft of the motor 67, meshing with a gear 68 on the shaft 69, and a small gear on such shaft meshing with a large gear 70 on the shaft 40 before mentioned, the latter shaft is rotated, see Fig. 5. The shaft 40 has secured to it an elliptical gear 72 which meshes with an elliptical gear 73 on a crank shaft 74. By means of cranks 75—75$^a$ at opposite ends of the shaft 74, connecting rods 76—76, pivoted to said cranks and to intermediate points on oscillating levers 77—77, the lower ends of which are pivoted upon opposite sides of the main frame, and links 78—78 pivoted to the upper ends of said levers and the side bars or rails 13 of the spacing frame, the frame is given a horizontal backward and forward movement as well as the up and down movement heretofore described. Means for adjusting the position of the pivotal bearing of the arms 77 in the main frame are provided to advance or retard the limit of the strokes of the spacing frame so as to enable the cakes to be delivered in accurate registration with the openings in the stencil plate. To this end the pivots 128 of the levers 77 are formed on the ends of a cross-shaft 129 mounted in the main frame eccentrically of the axis of such shaft. To the shaft 129 is secured a gear 130 arranged to mesh with a worm on a short shaft 131 rotatably journaled in a portion of the machine frame and provided with a hand wheel by which it may be turned.

Rigidly secured to the crank pin of the crank 75 and extending past the center of the shaft 71 to a point diametrically opposite thereof is a second crank 79 (see Figs. 1 and 2) which by a connecting rod 80 is arranged to reciprocate a pawl lever 81 adapted to cooperate with a ratchet wheel 82 secured to the shaft of the drum 3 to shift the carrier belt. As before explained the stroke of the spacing frame slightly exceeds that of the carrier belt,—the former moving ten inches, for example, while the latter moves eight inches,—and terminates an instant later. The variable speed produced by the elliptical gears is so timed as to give a relatively quick movement at the front end of the stroke, and a relatively slow or prolonged movement at the rear end of the stroke.

The U-shaped lifting frame which carries the coating mechanism is supported by a pair of approximately horizontal arms 83—84 rigidly secured to a front rock shaft 85, and a pair of similar arms 86—87 secured to a rear rock shaft 88, the arms 83 and 86 having depending extensions 83ª and 86ª, respectively, connected by a connecting rod 89 to cause the shafts 85 and 88 to rock in unison,—see Figs. 1, 2 and 6. The front rock shaft 85 has secured to it an arm 90, the lower end of which forms an abutment adapted to cooperate with an intermediate abutment on a cam lever 91 pivoted on the shaft 85 and equipped with a cam roller 92 engaging a double walled cam 93 secured to the shaft 40. The arm 90 and lever 91 are yieldingly connected through a spring 94 surrounding a threaded bolt 95 provided with an adjusting nut 96 in such manner that if the downward movement of the frame should be obstructed,—as by any unyielding article dropped between it and a portion of the machine frame,—the cam roller is free to follow the cam groove, and no breakage of parts is liable to occur.

The bars 55 and 56 and parts carried by them, including the hoppers and stripper mechanism, are horizontally reciprocated in the lifting frame by means of a pair of cams 97 fixed to opposite ends of the shaft 40 and engaging cam rollers 98 mounted intermediate the ends of vibrating levers 99, the lower ends of such levers being pivoted to the main frame 1 and the top ends connected by links 99ª with said bars 55 and 56, see Fig. 1.

The operation of the spacing mechanism has already been described, and the manner in which the coating mechanism operates will now be explained. At the end of the forward stroke of the spacing frame the lifting frame is in uppermost position with the stripper rods and knock-out pins elevated in such frame. The cam 112 now lowers the bar 111ª and cam block 111 bringing its inclined face 110 against the roller 109 and forcing the stripper rods and pins 106ª downwardly into lowermost position in contact with the cakes, the lifting frame and hopper frame remaining elevated, this position of the parts being shown in Fig. 5. The spacing frame now recedes and rises, and the coating mechanism immediately descends, the roller 109 meanwhile rolling down the inclined face 110, whereby the rock shafts 103 are rotated sufficiently to lift the stripper rods and pins with respect to the lifting frame at the same speed that the frame descends, thus maintaining the pins stationary upon the cakes until the frame has reached its lowermost position, shown in Fig. 7, in which the edges of the stencil plate nearly or quite touch the carrier belt at the sides of the space 4ª, the belt yielding at the center of such spaces under the stencil openings and holding the cakes against the stencil plate firmly but with an elastic pressure which prevents them from being crushed.

The hopper frame now starts rearwardly on its coating stroke, the springs 113 rotating the rock shafts 103 and holding the roller 109 against the cam block 111 while the stripper rods and pins 106ª rise until stopped in uppermost position by the cross-bar 100, as shown in Fig. 8, after which the roller 109 leaves the block 111 and the stripper rods remain elevated in position to clear the rear wall of the stencil box until near the end of the return stroke of the hopper. During the rearward stroke of the hopper the oscillation of the links 65, due to the horizontal movement of the hopper frame in the lifting frame causes a reciprocation of the connected valve mechanism to force a supply of the coating material downwardly through the throat of the hopper, and upon the return or forward traverse this action is repeated. The inclined front spreader wall of the hopper scrapes or spreads the coating material into the stencil openings effectively at the rearward traverse of the hopper, and the rear spreader wall acts in a similar manner upon the return, forward traverse, thus applying a smooth even coating to the cakes. Meanwhile the cam 112 on the shaft 40 has further lowered the sliding bar 111ª so that as the hopper frame is approaching the end of its forward stroke the roller 109 will contact the cam block 111 somewhat below the top of its inclined face 110. The depression of the stripper bars and pins resulting from the completion of the rearward stroke of the hopper structure will therefore be only sufficient to carry the pins to a point slightly above the level of the belt, (somewhat higher than the position shown in Fig. 7), and as the lifting frame and hopper structure rise after the completion of the rearward stroke of the hopper frame, the roller 109 will roll upward on the cam face 110, forcing the stripper pins downward relatively to the frame at the same rate as the frame rises until it passes the upper end of said face, so that the pins will temporarily remain stationary while the stencil box and hoppers rise, after which the pins and frame will rise together. Afterwards, and in time to avoid interference with the spacing frame, the cam 112 will operate to lift the bar 111ª to uppermost position, elevating the stripper pins to their uppermost position.

Referring to Figs. 3 and 4, it will be seen that the intermediate belt heretofore mentioned, marked 114, extends at its rear end around an actuating drum 115 rotatably mounted at the front end of the main frame at its front end around the rounded front edge of a supporting table 116, which is secured at its rear to the main frame and supported by standards 117 adjacent its front. The tray, or delivery belt 118, extends around an actuating drum 119 journaled in brackets at the front end of the main frame 1 and an idler roller rotatably mounted at the top of a suitable support 120 at its forward end. Both belts are given an intermittent or step-by-step movement by means of pawl-and-ratchet mechanisms connected with their respective actuating drums, and which are of ordinary construction and therefore unnecessary to be described in detail. The operating connections for the drums consist of a crank 121 on the shaft 40, a crank rod 122 pivoted to an oscillating lever 123, a connecting rod 124 pivoted to said lever 123 and connected to the pawl lever 125 of the pawl-and-ratchet mechanism for operating the drum 115, and a second connecting rod 126 also pivoted to the lever 123, and connected to the pawl lever 127 of the pawl-and-ratchet mechanism for operating the drum 119. For convenience of manufacture the lever 123 may be made of two separate members connected to the crank rod 122 by a common crank pin, and in order to provide for adjustment of the pivotal connection of the rods 124 and 126 with such lever, to vary the length of stroke of such rods and consequently the extent of movement imparted to the respective belts, each of the pivots is carried by a sliding block 128 slidingly mounted on said lever and engaged by an adjusting screw 129 by which its position may be regulated.

In the modification illustrated in Fig. 19, the endless carrier belt 2 of the machine above described is dispensed with, and a fabric band 130 stretched over the table 4 of the frame and suitably anchored at each end is substituted as the feeding surface over which the cakes are fed under the coating devices. The feeding mechanism in this form of machine comprises opposite sprocket chains 131 engaging sprocket wheels 132 between which are mounted notched pusher bars 133 which are not so thick as the cakes being operated upon. By suitable operating connections, not necessary to be here described, the chains and bars are given a step-by-step forward feeding movement to carry the rows successively under the coating mechanism.

The machine above described, it may be stated, is in practice used much of the time in connection with a suplementary wafer or cake depositing mechanism, such as described and claimed in my copending application for Patent No. 114,571, filed August 12th, 1916. A portion of such mechanism is illustrated in Fig. 5, referring to which it may be explained that cakes, fed from a feed table mounted on the supplementary frame 134 are intermittently fed by proper feeding devices onto a reciprocating shutter 135 immediately above the position assumed by a row of cakes which have been coated by the coating mechanisms of the machine. A vertically reciprocating transfer frame 136, equipped with groups of needles are lowered through the action of a cam 137 from their uppermost position to impale the cakes, then lifted slightly as the shutter is drawn back, then lowered to lowermost position to transfer the impaled cakes on to the tops of the coated cakes, then lifted to uppermost position again, a stripping device 138 acting to strip the cakes from the needles as the frame 136 rises. These devices, however, while of great utility in connection with the machine above described, form no part of the present invention, and need not be further described.

I claim:

1. In a machine for coating cakes and having means for supporting the cakes, a vertically movable member mounted in the machine frame, a plate carried by said vertically movable member and having a stencil opening and arranged to be intermittently lowered into contact with the top face of a cake, a hopper having its base slidably mounted upon said plate and having a bottom opening, and means for sliding said hopper on said plate from one side of the stencil opening to the other.

2. In a machine for coating cakes and having means for supporting the cakes, a vertically movable member mounted in the machine frame, a plate carried by said vertically movable member and having a stencil opening and arranged to be intermittently lowered into contact with the top face of a cake, a hopper having its base slidably mounted upon said plate and having a bottom opening, and means for slidingly reciprocating said hopper on said plate from one side of the stencil opening across to the other side and back.

3. In a machine for coating cakes and having means for supporting the cakes, a vertically movable member mounted in the machine frame, a plate carried by said vertically movable member and having a stencil opening and arranged to be intermittently lowered into contact with the top face of a cake, a hopper having at its base an inclined spreader wall forming one side of an opening in said base and the base being slidingly mounted upon said plate, and means for sliding said hopper across the stencil opening.

4. In a machine for coating cakes and having means for supporting the cakes, a vertically movable member mounted in the machine frame, a plate carried by said vertically movable member and having a stencil opening and arranged to be intermittently lowered into contact with the top face of a cake, a hopper having at its base front and rear inclined spreader walls on opposite sides of a bottom opening and slidingly mounted upon said plate, and means for slidingly reciprocating said hopper on said plate from one side of the stencil opening across to the other side and back.

5. In a machine for coating cakes and having means for supporting the cakes, a plate having a stencil opening and arranged to be intermittently brought into contact with the top face of a cake, a hopper having its base arranged to make sliding contact with said plate and having a bottom opening, means for sliding said hopper on said plate from one side of the stencil opening to the other, and means within said hopper for forcing material therein through the opening in its base.

6. In a machine for coating cakes and having means for supporting the cakes, a vertically movable member mounted in the machine frame, a plate carried by said vertically movable member and having a stencil opening and arranged to be intermittently lowered into contact with the top face of a cake, a hopper having at its base front and rear walls on opposite sides of a relatively narrow bottom opening and slidingly mounted upon said plate, and means for sliding said hopper across the stencil opening.

7. In a machine for coating cakes and having means for supporting the cakes, a vertically movable member mounted in the machine frame, a plate carried by said vertically movable member and having a stencil opening and arranged to be intermittently lowered into contact with the top face of a cake, a hopper having at its base front and rear inclined spreader walls on opposite sides of a relatively narrow bottom opening and slidingly mounted upon said plate, and means for sliding said hopper across the stencil opening.

8. In a machine for coating cakes and having means for supporting the cakes, a plate having a stencil opening and arranged to be intermittently brought into contact with the top face of a cake, a hopper having at its base front and rear walls on opposite sides of a relatively narrow bottom opening and arranged to make sliding contact with said plate, a flat bar arranged on edge centrally of said opening with its bottom flush with the edges of such opening, and means for sliding said hopper across the stencil opening.

9. In a machine for coating cakes and having means for supporting the cakes, a plate having a stencil opening and arranged to be intermittently brought into contact with the top face of a cake, a hopper having at its base front and rear inclined spreader walls on opposite sides extending downwardly from a relatively constricted throat and arranged to make sliding contact with said plate, means within said hopper for forcing material therein through said throat, and means for sliding said hopper across the stencil opening.

10. In a machine for coating cakes, a supporting table formed with spaces intermediate its length, a fabric stretched upon said table and spanning said spaces, means for spacing cakes along said table to points on said fabric above said spaces, a coating mechanism including a plate having stencil openings in alignment with the points to which the cakes are spaced, and means for bringing the stencil plate and supporting table towards each other to yieldingly clamp the cakes between the fabric and stencil plate.

11. In a machine for coating cakes, a supporting table formed with spaces intermediate its length, a fabric stretched upon said table and spanning said spaces, means for spacing cakes along said table to points on said fabric above said spaces, a coating mechanism including a plate having stencil openings in alignment with the points to which the cakes are spaced, and means for lowering the stencil plate upon the cakes to clamp them yieldingly against the fabric.

12. In a machine for coating cakes, a supporting table formed with spaces intermediate its length, a fabric carrier belt stretched upon said table and spanning said spaces, means for spacing cakes along said belt to points above said spaces, a coating mechanism including a plate having stencil openings in alignment with the points to which the cakes are spaced, and means for lowering the stencil plate upon the cakes to clamp them yieldingly against the belt.

13. In a machine for coating cakes and having a longitudinal cake-supporting surface, and means for intermittently spacing cakes in rows along said surface, coating mechanism comprising a box having a bottom plate formed with a row of stencil openings, means for lowering said box to clamp a row of cakes upon the cake-supporting surface, a hopper having an open bottom slidingly seated upon the bottom of said box, and means for horizontally reciprocating said hopper.

14. In a machine for coating cakes and having a longitudinal cake-supporting surface and means for intermittently spacing cakes in rows along said surface, a lifting frame, a box carried by said frame and having a bottom plate formed with a row of stencil openings, a hopper mounted to slide horizontally in said lifting frame and formed with an open bottom making sliding contact with the bottom of said box, means for raising and lowering said frame, and means for reciprocating said hopper.

15. In a machine for coating cakes and having a longitudinal cake-supporting surface and means for intermittently spacing cakes in rows along said surface, a lifting frame, a box carried by said frame and having a bottom plate formed with a row of stencil openings, a hopper mounted to slide horizontally in said lifting frame and formed with an open bottom making sliding contact with the bottom of said box, means for raising and lowering said frame, means for reciprocating said hopper, forcing mechanism in said hopper, and actuating means intermediate said lifting frame and forcing mechanism for operating the latter.

16. In a machine for coating cakes and having a longitudinal cake-supporting surface and means for intermittently spacing cakes in rows along said surface, a lifting frame, a box carried by said frame and having a bottom plate formed with a row of stencil openings, a hopper mounted to slide horizontally in said lifting frame and formed with an open bottom making sliding contact with the bottom of said box, means for raising and lowering said frame, means for reciprocating said hopper, a reciprocating plunger in said hopper, and a pair of swinging links pivoted to said lifting frame and to said plunger for reciprocating the latter.

17. In a machine for coating cakes and having a longitudinal cake-supporting surface and means for intermittently spacing cakes in rows along said surface, a lifting frame comprising a pair of U-shaped frame members arranged one at each side of the machine, a pair of stencil-box frames rigidly secured between, a pair of stencil boxes secured one in each frame, a pair of bars supported by the upright portions of said U-shaped frame members and arranged to reciprocate horizontally, a pair of hoppers secured to and connecting said bars and arranged to slide in said stencil boxes, means for raising and lowering said lifting frame, and means for reciprocating said connected bars and hoppers.

18. In a machine of the character described, a lifting frame, means for raising and lowering said frame, a stencil plate supported by said frame and formed with a row of stencil openings, a horizontally reciprocating frame including a hopper having an open base arranged to slide over the stencil plate, and stripper mechanism mounted upon said horizontally reciprocating frame.

19. In a machine of the character described, a lifting frame, means for raising and lowering said frame, a stencil plate supported by said frame and formed with a row of stencil openings, a horizontally reciprocating frame including a hopper having an open base arranged to slide over the stencil plate, a rock shaft pivotally mounted in said horizontally reciprocating frame, a pair of rock arms secured to said shaft, a series of groups of vertically reciprocating knock-out pins operatively connected with said rock arms, a contact member connected with said rock-shaft, and a cooperating contact member mounted upon the main frame of the machine.

20. In a machine of the character described, a lifting frame, means for raising and lowering said frame, a stencil plate supported by said frame and formed with a row of stencil openings, a horizontally reciprocating frame including a hopper having an open base arranged to slide over the stencil plate, a rock shaft pivotally mounted in said horizontally reciprocating frame, a pair of rock arms secured to said shaft, a cross-bar secured to said frame, a series of stripper rods equipped with knock-out pins mounted to reciprocate vertically in said cross-bar, the upper ends of said stripper rods being connected by a cross rod and said cross rod being operatively connected to said rock arms, a crank fixed to said rock shaft, a contact member connected with a said crank, and a cooperating contact member mounted upon the main frame of the machine.

21. In a machine of the character described, a lifting frame, means for raising and lowering said frame, a pair of stencil boxes supported by said frame and each having a bottom plate formed with a row of stencil openings, a horizontally reciprocating frame including a corresponding pair of hoppers each having an open base and being arranged to slide over its respective stencil plate, a corresponding pair of rock-shafts pivotally mounted in said horizontally reciprocating frame, a corresponding pair of series of knock-out pins cooperatively connected with the respective rock shafts to be vertically reciprocated in unison, a crank fixed to each rock shaft, a rod pivotally connected to both shafts, a contact member mounted on said rod, and a cooperating contact member mounted upon the main frame of the machine.

22. In a machine of the character described, a lifting frame, means for raising and lowering said frame, a stencil plate supported by said frame and formed with a row of stencil openings, a horizontally reciprocating frame including a hopper having an open base arranged to contact the stencil plate slidingly and make intermittently a complete to-and-fro traverse across the stencil openings, a rock shaft journaled in said horizontally reciprocating frame, a series of groups of vertically reciprocating knock-out pins cooperatively connected with said rock shaft, a contact member connected with said rock shaft, and a cooperating contact member mounted upon the main frame of the machine, said two contact members cooperating temporarily at the beginning and again at the end of each to-and-fro traverse to control the position of the knock-out pins.

23. In a machine of the character described, a lifting frame, means for raising and lowering said frame, a stencil plate supported by said frame and formed with a row of stencil openings, a horizontally reciprocating frame including a hopper having an open base arranged to contact the stencil plate slidingly and make intermittently a complete to-and-fro traverse across the stencil openings, a rock shaft journaled in said horizontally reciprocating frame, a series of groups of vertically reciprocating knock-out pins cooperatively connected with said rock shaft, spring tension means acting to yieldingly urge said pins to raised position, a contact member connected with said rock shaft, and a cooperating contact member mounted upon the main frame of the machine, said two contact members cooperating temporarily at the beginning and again at the end of each to-and-fro traverse to maintain the knock-out pins in lower position.

24. In a machine of the character described, a lifting frame, means for raising and lowering said frame, a stencil plate supported by said frame and formed with a row of stencil openings, a horizontally reciprocating frame including a hopper having an open base arranged to contact the stencil plate slidingly and make intermittently a complete to-and-fro traverse across the stencil openings, a rock shaft journaled in said horizontally reciprocating frame, a series of groups of vertically reciprocating knock-out pins cooperatively connected with said rock shaft, spring tension means acting to yieldingly urge said pins to raised position, a contact member connected with said rock shaft, a vertically movable cooperating contact member having an inclined working face mounted upon the main frame of the machine, the inclined face of said last mentioned contact member while in one position acting during the descent of the lifting frame to lift the knock-out pins relatively to such frame at the same rate as the frame descends, whereby the pins are held stationary in lowermost position, and such inclined face of the contact member in a changed position acting during the ascent of the lifting frame to lower said pins in the frame at the same rate as the frame rises, whereby the pins are held stationary in a lowered position.

25. In a machine of the character described, a lifting frame, means for raising and lowering said frame, a stencil plate supported by said frame and formed with a row of stencil openings, a horizontally reciprocating frame including a hopper having an open base arranged to contact the stencil plate slidingly and make intermittently a complete to-and-fro traverse across the stencil openings, a rock shaft journaled in said horizontally reciprocating frame, a series of groups of vertically reciprocating knock-out pins cooperatively connected with said rock shaft, spring tension means acting to yieldingly urge said pins to raised position, a contact member connected with said rock shaft, a vertically movable cooperating contact member having an inclined working face mounted upon the main frame of the machine, and means for shifting said last mentioned contact member from uppermost position to an intermediate position prior to the descent of said lifting frame whereby said pins will be shifted to their lowermost position and held stationary while said frame descends, and then shifted to a lower position while the hopper frame makes a to-and-fro movement and while said contact members are separated and the pins raised to a higher position, whereby the pins will be again lowered and held stationary as the lifting frame rises, and then shifted to its original uppermost position, whereby the pins will be elevated to their uppermost position.

26. In a machine for coating cakes, a pair of plates having stencil openings, a pair of open-bottom hoppers slidingly mounted on said plates, cake-supporting means for supporting the cakes below said plates, said plates and said cake-supporting means being intermittently movable relatively to each other in a vertical direction to bring the cakes to rest in juxtaposition with the plates, means for intermittently advancing the cakes in succession from position of alignment below the openings of one plate to position of alignment below the openings of the other plate, and means for simultaneously sliding said hoppers on said plates across said stencil openings in the intervals of rest between the movements of said cakes.

27. In a machine for coating cakes, a pair of plates having stencil openings, a pair of open-bottom hoppers slidingly mounted on said plates, an intermittently movable conveyor for supporting the cakes and advancing them successively from position of alignment below the openings of one plate to position of alignment below the openings of the other plate, said conveyor and plates being relatively movable vertically to bring cakes upon said conveyor to rest in juxtaposition with said openings, and means for simultaneously sliding said hoppers on said plates across said stencil openings in the intervals of rest between the movements of said conveyor.

28. In a machine for coating cakes, a pair of plates having stencil openings, a pair of open-bottom hoppers slidingly mounted on said plates, said hoppers being connected together to slide in unison, an intermittently movable conveyor for supporting the cakes and advancing them successively from beneath one plate to the other, said conveyor and plate being relatively movable vertically to bring cakes upon said conveyor to rest in juxtaposition with said openings, and means for sliding said connected hoppers on said plates across said stencil openings in the intervals of rest between the movements of said conveyor.

FERDINANDO G. SALERNO.